(12) United States Patent
Grant

(10) Patent No.: US 8,926,467 B2
(45) Date of Patent: Jan. 6, 2015

(54) TRANSMISSION WITH REVERSE DRIVE ASSEMBLY

(71) Applicant: Harley-Davidson Motor Company Group, LLC, Milwaukee, WI (US)

(72) Inventor: Steven D. Grant, Hartland, WI (US)

(73) Assignee: Harley-Davidson Motor Company Group, LLC, Milwaukee, WI (US)

( * ) Notice: Subject to any disclaimer, the term of this patent is extended or adjusted under 35 U.S.C. 154(b) by 148 days.

(21) Appl. No.: 13/790,489

(22) Filed: Mar. 8, 2013

(65) Prior Publication Data

US 2014/0256503 A1    Sep. 11, 2014

(51) Int. Cl.
*F16H 3/08* (2006.01)
*F16H 3/14* (2006.01)

(52) U.S. Cl.
USPC .............................. 475/207; 475/302; 74/325

(58) Field of Classification Search
USPC ............. 475/207, 302, 323; 74/325, 329, 331
See application file for complete search history.

(56) References Cited

U.S. PATENT DOCUMENTS

| | | |
|---|---|---|
| 1,469,984 A | 10/1923 | Barlough |
| 3,005,360 A | 10/1961 | Carlson |
| 3,347,108 A | 10/1967 | Hinke |
| 3,429,200 A | 2/1969 | Green |
| 3,842,691 A | 10/1974 | Shea |
| 3,908,483 A | 9/1975 | Piquette |
| 4,304,150 A | 12/1981 | Lupo et al. |
| 4,523,491 A | 6/1985 | Dittmann, Jr. |
| 4,583,613 A | 4/1986 | Nakayama |
| 4,635,506 A | 1/1987 | Imaizumi et al. |
| 4,658,661 A | 4/1987 | Terashita |
| 4,713,979 A | 12/1987 | Muto et al. |
| 4,754,662 A | 7/1988 | Misawa |
| 4,757,886 A | 7/1988 | Brown et al. |
| 4,763,538 A | 8/1988 | Fujita et al. |
| 4,827,148 A | 5/1989 | Hirosawa et al. |

(Continued)

FOREIGN PATENT DOCUMENTS

| | | |
|---|---|---|
| CN | 1356235 | 7/2002 |
| CN | 1598362 | 3/2005 |

(Continued)

OTHER PUBLICATIONS

Baker, Premium Drivetrain Innovations for American Motorcycles, figure, available at least as early as Mar. 7, 2012, (1 page).

(Continued)

*Primary Examiner* — Sherry Estremsky
(74) *Attorney, Agent, or Firm* — Michael Best & Friedrich LLP

(57) ABSTRACT

A transmission assembly includes a reverse drive assembly including a reverse drive shaft, a reverse drive input gear in constant mesh with a main shaft gear, a planetary gear system, and a reverse drive output gear. The reverse drive assembly is driven by the main shaft gear in forward and reverse. The reverse drive output gear is configured to drive a counter shaft through a corresponding multi-gear half shaft when in reverse. The half shaft is supported on the main shaft and can be selectively unlocked from the main shaft to provide a reverse gear ratio, thereby establishing a reverse power transmission path from the main shaft, through the reverse drive assembly, through the half shaft in the un-locked condition to the counter shaft, and to an output drive supported on the main shaft.

24 Claims, 15 Drawing Sheets

(56) References Cited

U.S. PATENT DOCUMENTS

| | | | |
|---|---|---|---|
| 4,869,332 A | 9/1989 | Fujita et al. | |
| 4,870,874 A | 10/1989 | Ito | |
| 4,923,028 A | 5/1990 | Yamashita et al. | |
| 4,938,092 A | 7/1990 | Nebu et al. | |
| 4,974,694 A | 12/1990 | Matsumoto | |
| 4,974,695 A | 12/1990 | Politte | |
| 5,024,113 A | 6/1991 | Ito et al. | |
| 5,069,304 A | 12/1991 | Mann | |
| 5,180,346 A | 1/1993 | Carriere | |
| 5,542,309 A | 8/1996 | Wenger et al. | |
| 5,593,358 A | 1/1997 | Frost | |
| 5,830,099 A | 11/1998 | Forsyth | |
| 5,951,434 A | 9/1999 | Richards et al. | |
| 6,012,351 A | 1/2000 | Ysker | |
| 6,024,198 A | 2/2000 | Hamby et al. | |
| 6,054,826 A | 4/2000 | Murakami et al. | |
| 6,076,416 A | 6/2000 | Sputhe | |
| 6,267,192 B1 | 7/2001 | Maier et al. | |
| 6,422,103 B1 * | 7/2002 | Forsyth | 74/331 |
| 6,457,374 B1 | 10/2002 | Shen | |
| 6,457,381 B1 | 10/2002 | Nonaka et al. | |
| 6,708,579 B2 | 3/2004 | Punko | |
| 7,017,697 B2 | 3/2006 | Yang | |
| 7,121,162 B2 * | 10/2006 | Hatakeyama et al. | 74/360 |
| 7,156,197 B2 | 1/2007 | Sanchez et al. | |
| 7,303,502 B2 | 12/2007 | Thompson | |
| 7,311,636 B1 | 12/2007 | Regula | |
| 7,399,252 B2 | 7/2008 | Kingston | |
| 7,454,994 B2 | 11/2008 | Mamba | |
| 7,610,979 B1 | 11/2009 | Dykowski et al. | |
| 7,665,774 B2 | 2/2010 | Kumagai et al. | |
| 7,757,576 B1 | 7/2010 | Einboeck | |
| 7,815,542 B2 | 10/2010 | Dec | |
| 7,886,634 B2 | 2/2011 | Walters et al. | |
| 7,952,305 B2 | 5/2011 | Fischer et al. | |
| 8,001,862 B2 | 8/2011 | Albulushi et al. | |
| 8,096,916 B2 | 1/2012 | Matsumoto | |
| 2007/0022833 A1 | 2/2007 | Mamba | |
| 2007/0062318 A1 | 3/2007 | Chang | |
| 2009/0107277 A1 | 4/2009 | Ennsmann | |
| 2009/0126522 A1 | 5/2009 | Albulushi et al. | |
| 2010/0077884 A1 | 4/2010 | Ono et al. | |
| 2011/0015022 A1 | 1/2011 | Stoeckl et al. | |
| 2012/0304789 A1 * | 12/2012 | Misu et al. | 74/331 |

FOREIGN PATENT DOCUMENTS

| | | |
|---|---|---|
| CN | 1817731 | 8/2006 |
| CN | 201003427 | 1/2008 |
| CN | 101177162 | 5/2008 |
| CN | 201090688 | 7/2008 |
| CN | 201125989 | 10/2008 |
| CN | 201201703 | 3/2009 |
| CN | 201202776 | 3/2009 |
| CN | 101435491 | 5/2009 |
| CN | 201318214 | 9/2009 |
| CN | 201318215 | 9/2009 |
| CN | 201322090 | 10/2009 |
| CN | 201377568 | 1/2010 |
| EP | 0980974 | 2/2000 |
| EP | 1097317 | 5/2001 |
| EP | 1564439 | 8/2005 |
| EP | 1132288 | 4/2006 |
| EP | 1695897 | 2/2008 |
| GB | 2157780 | 10/1985 |
| GB | 2193273 | 2/1988 |
| JP | 58050346 | 3/1983 |
| JP | 59140127 | 8/1984 |
| JP | 01078995 | 3/1989 |
| JP | 06241316 | 8/1994 |
| JP | 11082668 | 3/1999 |
| JP | 2000103385 | 4/2000 |
| JP | 2001163072 | 6/2001 |
| JP | 2006199174 | 8/2006 |
| JP | 2007030695 | 2/2007 |
| JP | 2007062460 | 3/2007 |
| JP | 2009127865 | 6/2009 |
| JP | 2010083339 | 4/2010 |
| RU | 2011556 | 4/1994 |
| SU | 1722907 | 3/1992 |
| WO | WO 0004305 | 1/2000 |
| WO | WO 2009134256 | 11/2009 |

OTHER PUBLICATIONS

Canam Spyder, Drivetrain 991 ETC SA, figure, available at least as early as Mar. 7, 2012, (1 page).

BMW, Drivetrain K1200LT, figure, available at least as early as Mar. 7, 2012, (1 page).

* cited by examiner

TRANSMISSION WITH REVERSE DRIVE ASSEMBLY

BACKGROUND

The present invention relates to transmissions for vehicles, and more particularly, to reverse drive systems for motorcycles, both 2-wheeled and 3-wheeled.

Motorcycles can be hard to push and direct when, for example, parking or moving the motorcycle in a reverse direction.

SUMMARY

In one aspect, the invention provides a transmission assembly having a main shaft assembly including a main shaft gear provided on a main shaft and rotatable therewith. A half shaft is supported on the main shaft and includes a plurality of co-rotating gears. The half shaft is operable in a locked condition in which the half shaft is rotationally fixed with the main shaft, and an un-locked condition in which the half shaft is rotatable about the main shaft. The transmission assembly also includes a counter shaft assembly including a plurality of gears supported on a counter shaft, the plurality of gears being in constant mesh with corresponding ones of the plurality of gears of the half shaft. An output drive is supported on the main shaft and drivable by the counter shaft. A forward power transmission path is established from the main shaft and the half shaft in the locked condition, through the counter shaft, to the output drive. The transmission assembly further includes a reverse drive assembly including a reverse drive shaft, a reverse drive input gear in constant mesh with the main shaft gear, a planetary gear system, and a reverse drive output gear. The reverse drive output gear is configured to drive a predetermined one of the plurality of gears on the counter shaft through a corresponding one of the half shaft gears when the half shaft is in the un-locked condition to establish a reverse power transmission path from the main shaft, to the reverse drive assembly, through the half shaft in the un-locked condition, to the predetermined counter shaft gear, and to the output drive.

In another aspect, the invention provides a transmission assembly having a main shaft assembly including a main shaft gear provided on a main shaft and rotatable therewith. A half shaft is supported on the main shaft and includes a plurality of co-rotating gears. The half shaft is operable in a locked condition in which the half shaft is rotationally fixed with the main shaft, and an un-locked condition in which the half shaft is rotatable about the main shaft. The transmission assembly also includes a counter shaft assembly including a plurality of gears supported on a counter shaft, the plurality of gears being in constant mesh with corresponding ones of the plurality of gears of the half shaft. An output drive is supported on the main shaft and drivable by the counter shaft. A forward power transmission path is established from the main shaft and the half shaft in the locked condition, through the counter shaft, to the output drive. The transmission assembly further includes a reverse drive assembly including a reverse drive shaft, a reverse drive input gear in constant mesh with the main shaft gear, and a reverse drive output gear. The reverse drive assembly is operable in a torque-transmitting mode and a non-torque-transmitting mode. A shifting assembly is operable to simultaneously select the unlocked condition of the half shaft and place the reverse drive assembly in the torque-transmitting mode. The reverse drive output gear is configured to drive a predetermined one of the plurality of gears on the counter shaft through a corresponding one of the half shaft gears when the half shaft is in the un-locked condition to establish a reverse power transmission path from the main shaft, to the reverse drive assembly, through the half shaft in the un-locked condition, to the predetermined counter shaft gear, and to the output drive.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
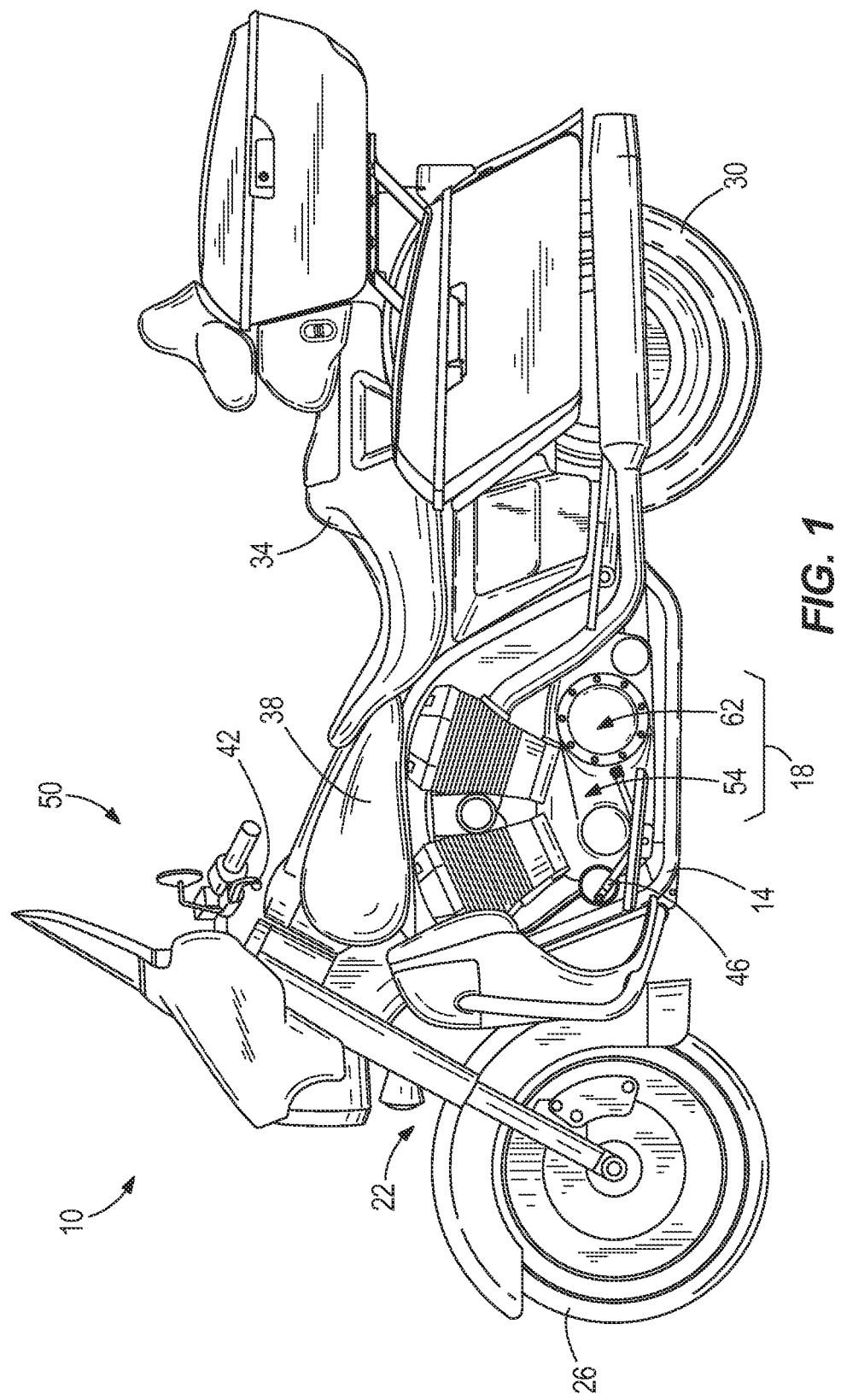
FIG. 1 is a side view of a two-wheeled motorcycle.
Figure 2:
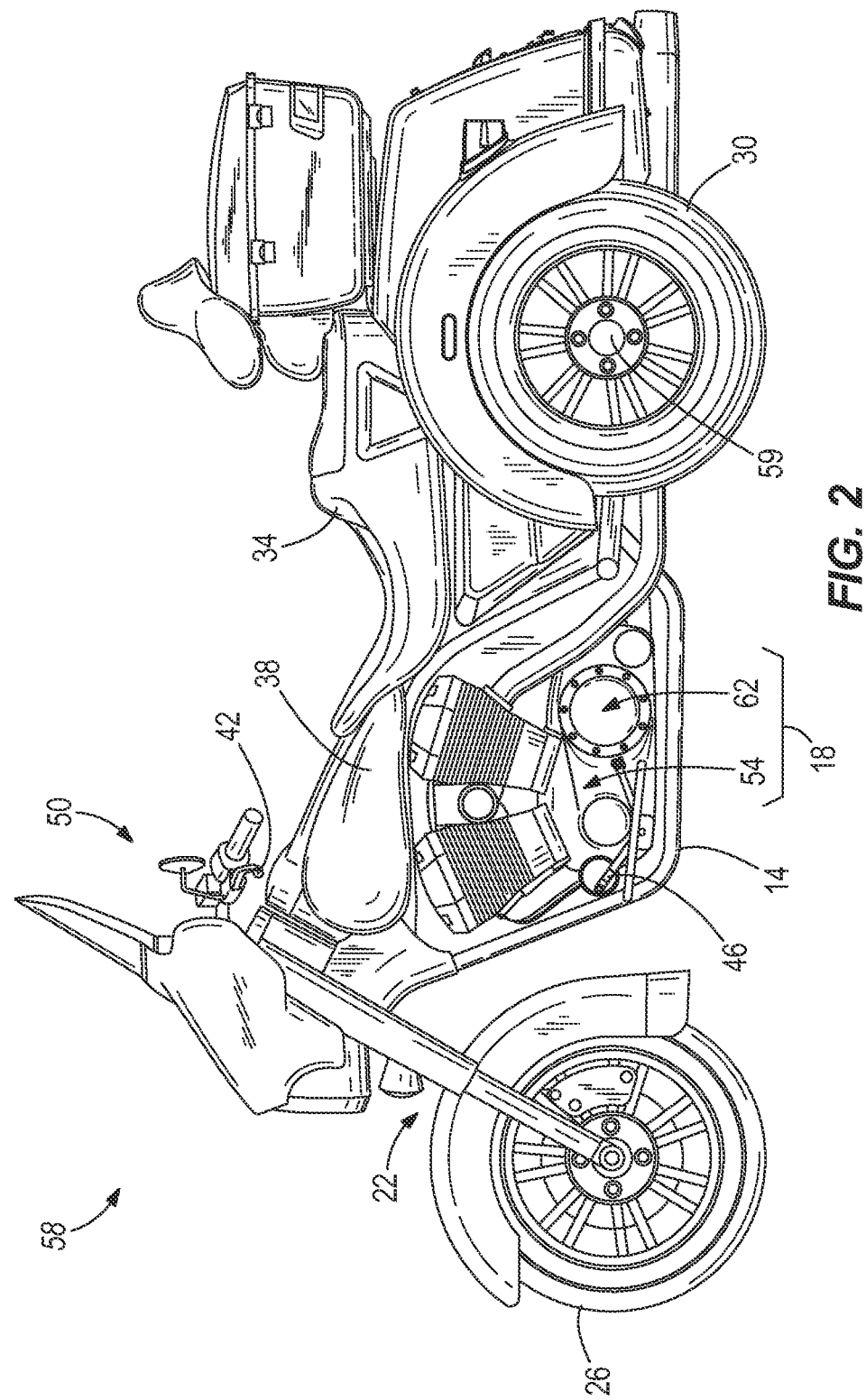
FIG. 2 is a side view of a three-wheeled motorcycle.

FIG. 1 illustrates a vehicle 10 according to one embodiment of the invention. In the illustrated embodiment, the vehicle 10 is a motorcycle. The motorcycle 10 includes a frame 14, an engine/transmission unit 18, a front fork assembly 22, a front wheel 26, a rear wheel 30, a seat 34, a fuel tank 38, a hand-operated clutch lever 42, and a foot-operated shifter 46. The frame 14 supports the engine/transmission unit 18, the front fork assembly 22, the seat 34, and the fuel tank 38. The front fork assembly 22 is pivotally coupled to the frame 14 and supports the front wheel 26 and a handle bar assembly 50 upon which the hand-operated clutch lever 42 is mounted. The seat 34 is coupled to the frame 14 behind the front fork assembly 22 and is configured for supporting a rider and a passenger. The foot-operated shifter 46 is coupled to the engine/transmission unit 18 so that a user can operate the shifter 46 with their foot to select transmission gear ratios as described in further detail below. The fuel tank 38 is supported by the frame 14 and provides fuel to an engine 54 (e.g., internal combustion engine) of the engine/transmission unit 18 during operation of the motorcycle 10. FIG. 2 illustrates another motorcycle 58 that includes a rear axle assembly 59 with two rear wheels 30. Components similar to those of the motorcycle 10 of FIG. 1 are numbered identically.

Figure 3A:
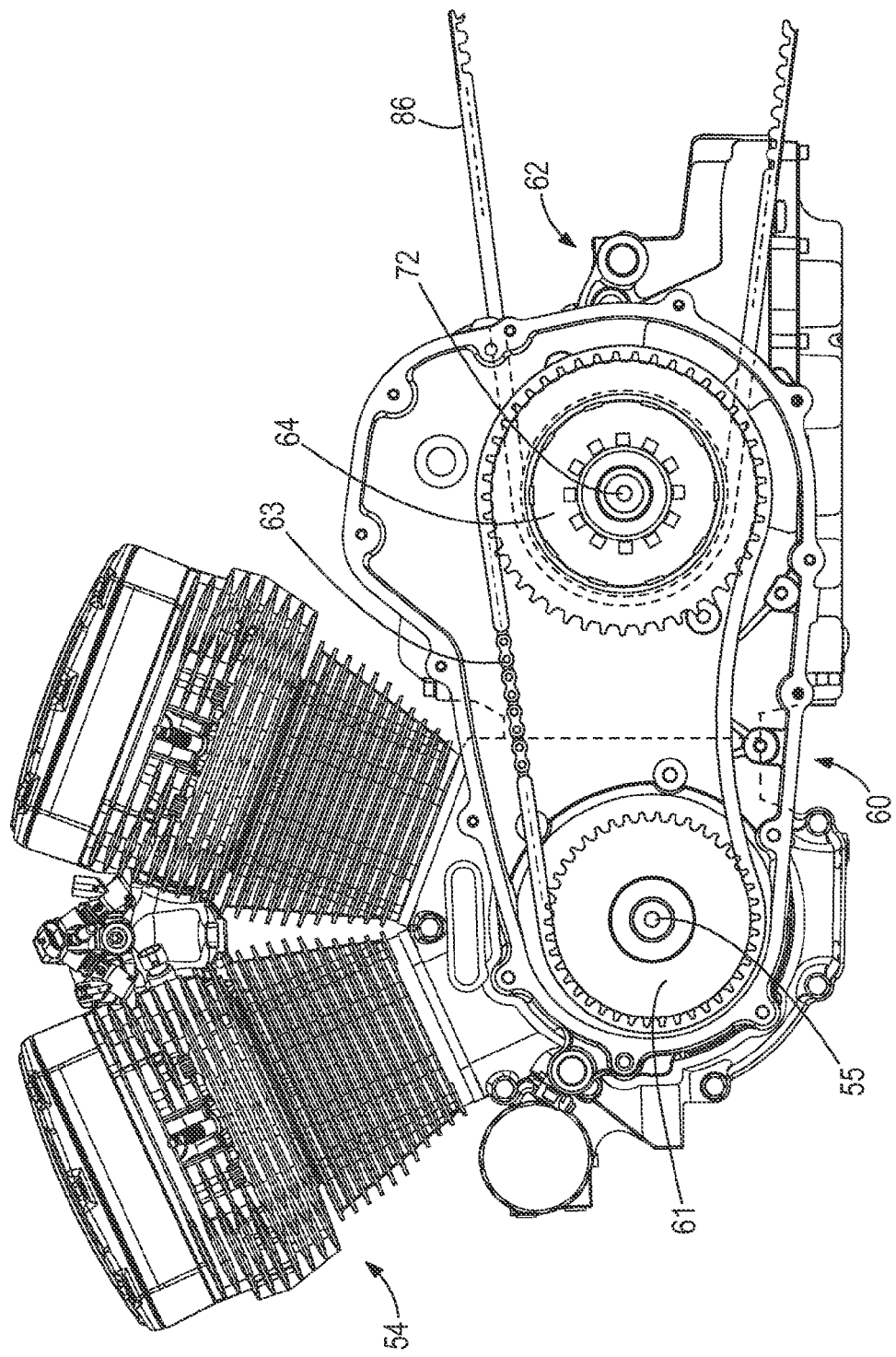
FIG. 3A is a perspective view a transmission assembly, an engine assembly, and a primary assembly.

The engine/transmission unit 18 is coupled to the frame 14 beneath the seat 34 and between the front wheel 26 and the rear wheel(s) 30 of the motorcycles 10, 58. In the illustrated embodiment, the engine 54 of the engine/transmission unit 18 is a V-twin engine 54, but other engine configurations are optional. The engine 54 drives the rear wheel(s) 30 through a transmission assembly 62 of the engine/transmission unit 18. With reference to FIG. 3A, the engine 54 includes an output shaft, or crankshaft 55, coupled to the transmission 62 via a primary assembly 60. The primary assembly 60 includes a drive member (e.g., a sprocket, a gear, a pulley, or the like) 61 mounted on the crankshaft 55 for driving a primary loop member (e.g., a chain, a belt, or the like) 63. The primary assembly 60 further includes a clutch pack 64 including a clutch pack input driven by the primary loop member 63. The clutch pack 64 includes a clutch pack output coupled to the transmission assembly 62. The clutch pack 64 is biased to an engaged state to transmit rotational power. The power at the engine crankshaft 55 is connectable to the transmission assembly 62 through the clutch pack 64. The clutch pack 64 is selectively moved to a disengaged state by the user via the hand-operable clutch lever 42. The clutch pack 64 is operable to disengage the transmission assembly 62 from the engine 54 when the hand-operated clutch lever 42 is pulled, and allows for shifting events to occur in the transmission assembly 62 in response to a user actuating the foot-operated shifter 46. It will also be appreciated that one or both of the shifting and clutch operation may be automated or semi-automated, as opposed to directly, mechanically operated by the rider.

Figure 3B:
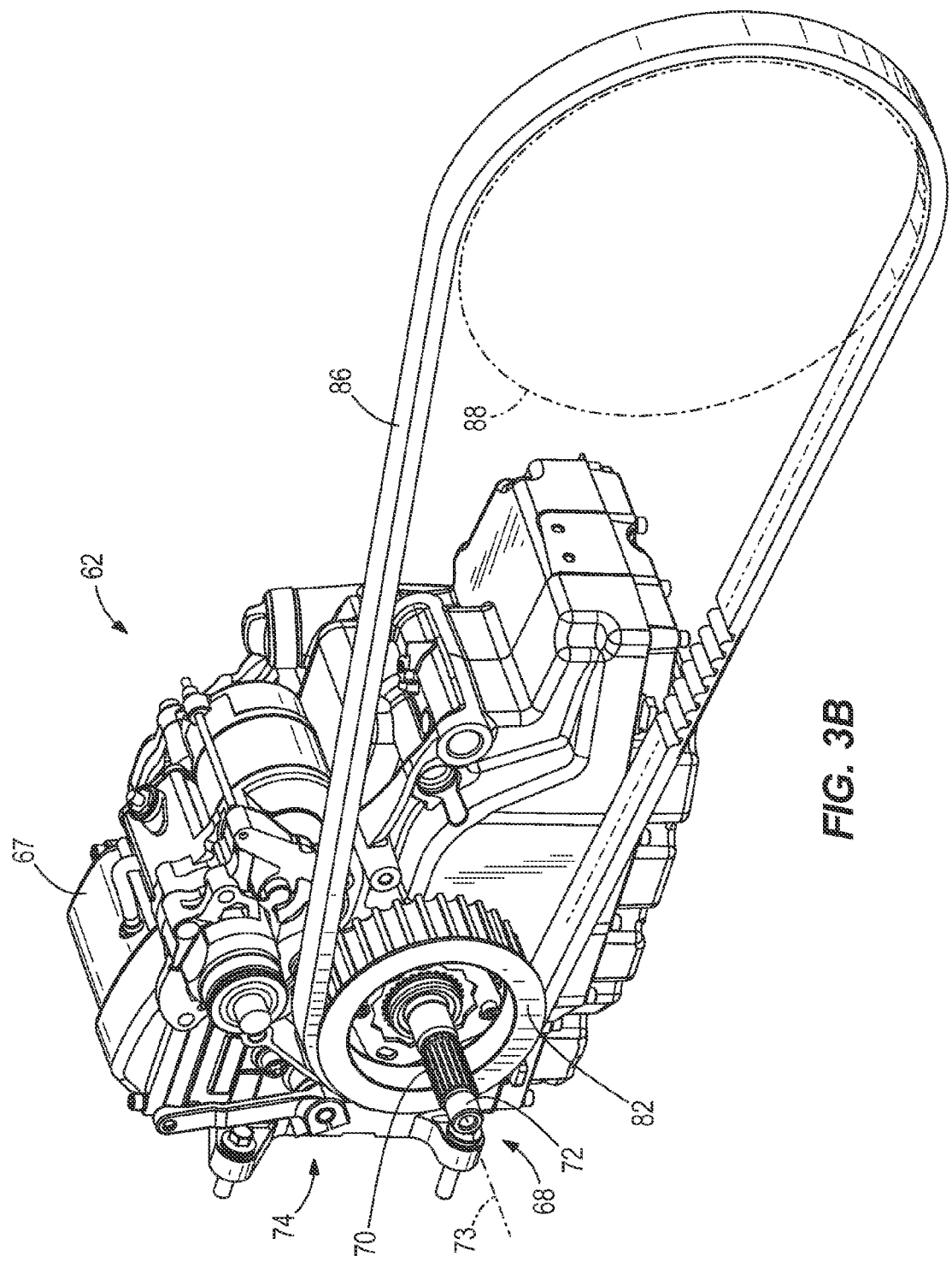
FIG. 3B is a perspective view the transmission assembly of FIG. 3A, and a final drive assembly.

With reference to FIG. 3B, the transmission assembly 62 includes a transmission housing 67 and a main shaft assembly 68. The main shaft assembly 68 includes a main shaft 72 defining a main shaft rotational axis 73. The main shaft 72 includes a main shaft input spline, or transmission input 70 extending out of the housing 67 and coupled to the clutch pack 64 to selectively receive driving input from the engine 54. In addition, the transmission assembly 62 includes an output drive assembly 74 supported on the main shaft 72 including a gear 78 (FIG. 4) positioned within the housing 67. The output drive assembly 74 also includes an output drive member 82 (e.g. a sprocket, a gear, a pulley, or the like), external to the housing 67 but rotatable with the gear 78, for driving the rear wheel(s) 30 with a final drive loop member 86 (e.g., a chain, a belt, or the like). The final drive loop member 86 is drivingly coupled to a wheel drive member 88 (e.g., a sprocket, gear, rear axle assembly, etc.) secured to the rear wheel(s) 30.

Figure 4:
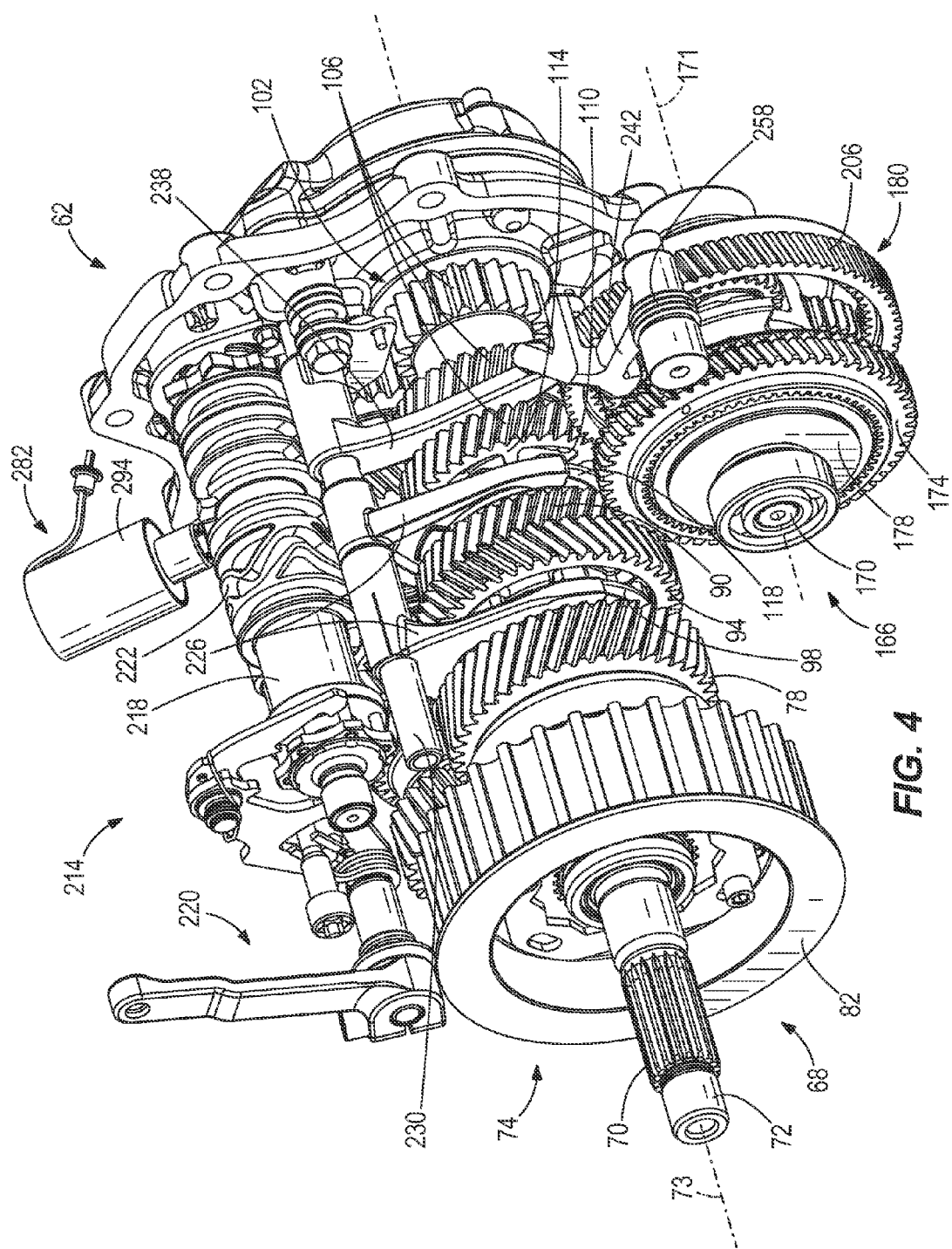
FIG. 4 is a perspective view of the transmission assembly of FIG. 3B.

With reference to FIG. 4, the main shaft assembly 68 includes a main shaft gear 90 configured for co-rotation with the main shaft 72 (e.g., formed integrally as a single piece with the main shaft 72). The main shaft assembly 68 includes a gear 94 adjacent the gear 90 that is selectively engaged for rotation with the main shaft 72 by a dog ring 98 rotationally locked (e.g., splined) on the main shaft 72 and slideable thereon. In addition, the dog ring 98 is selectively engageable with the gear 78 of the output drive assembly 74 to directly couple the main shaft 72 and the output drive assembly 74 so that the output drive assembly 74 rotates in a 1:1 ratio with the transmission input 70.

The transmission assembly 62 further includes a half shaft 102 supported on the main shaft 72. The half shaft 102 includes a plurality of gears 106 co-rotatable together. As illustrated, the half-shaft 102 includes three gears 106, all of different diameter and tooth count, integrally formed as a single piece. The half shaft 102 includes a front surface 114 having a plurality of pockets 110. A dog ring 118 is supported on the main shaft 72 proximal to the front surface 114. The dog ring 118 includes a plurality of lugs 122, corresponding to and engageable with the plurality of pockets 110 on the half shaft 102. When the dog ring 118 is placed in an engaged position (FIG. 14), the lugs 122 are inserted into the pockets 110 and the half shaft 102 is locked to the main shaft 72 for co-rotation. When the dog ring 118 is placed in a disengaged position (FIGS. 15 and 16), the lugs 122 are removed from the pockets 110 and the half shaft 102 is unlocked from the main shaft 72.

Figure 5:
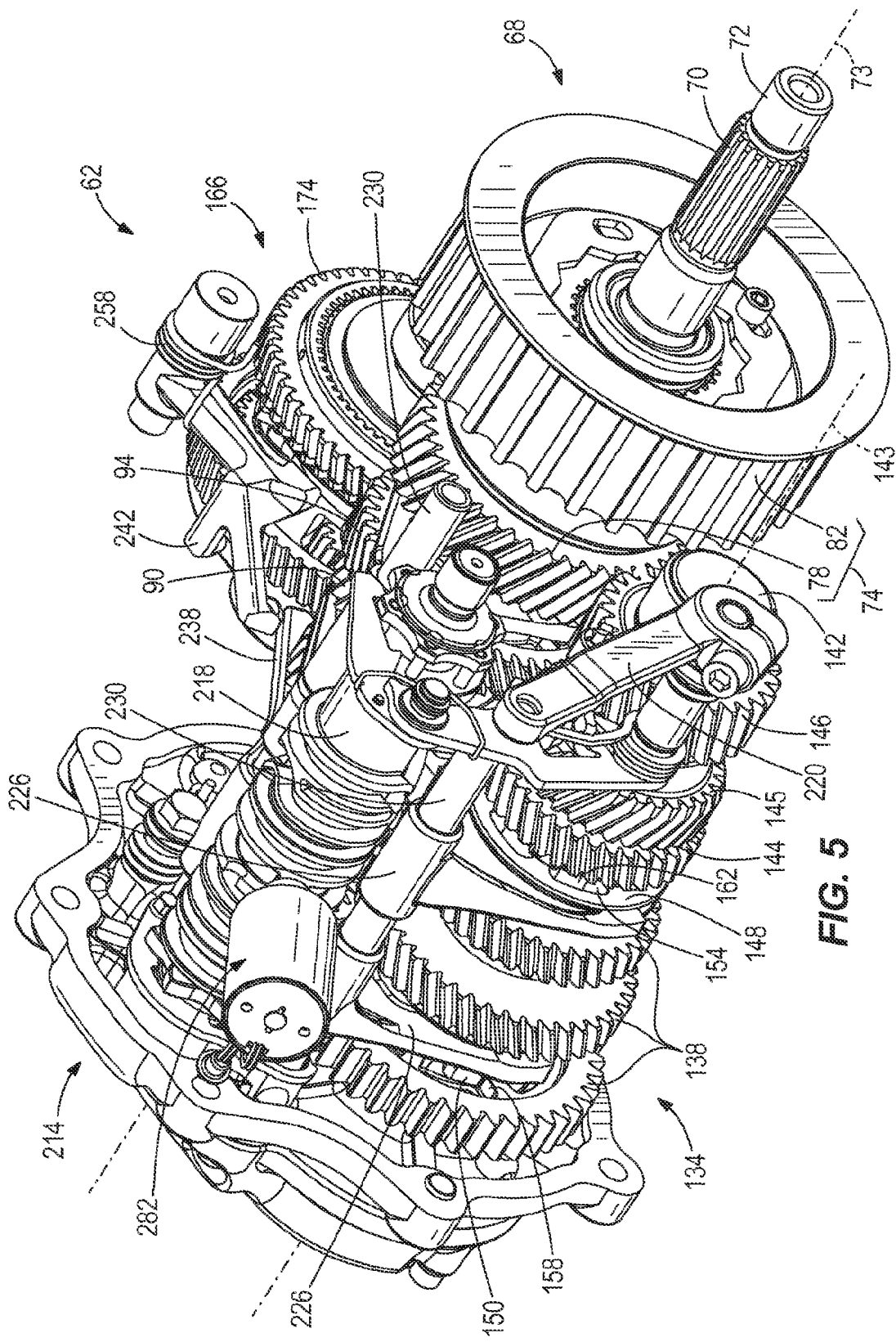
FIG. 5 is another perspective view of the transmission assembly of FIG. 3B.
Figure 6:
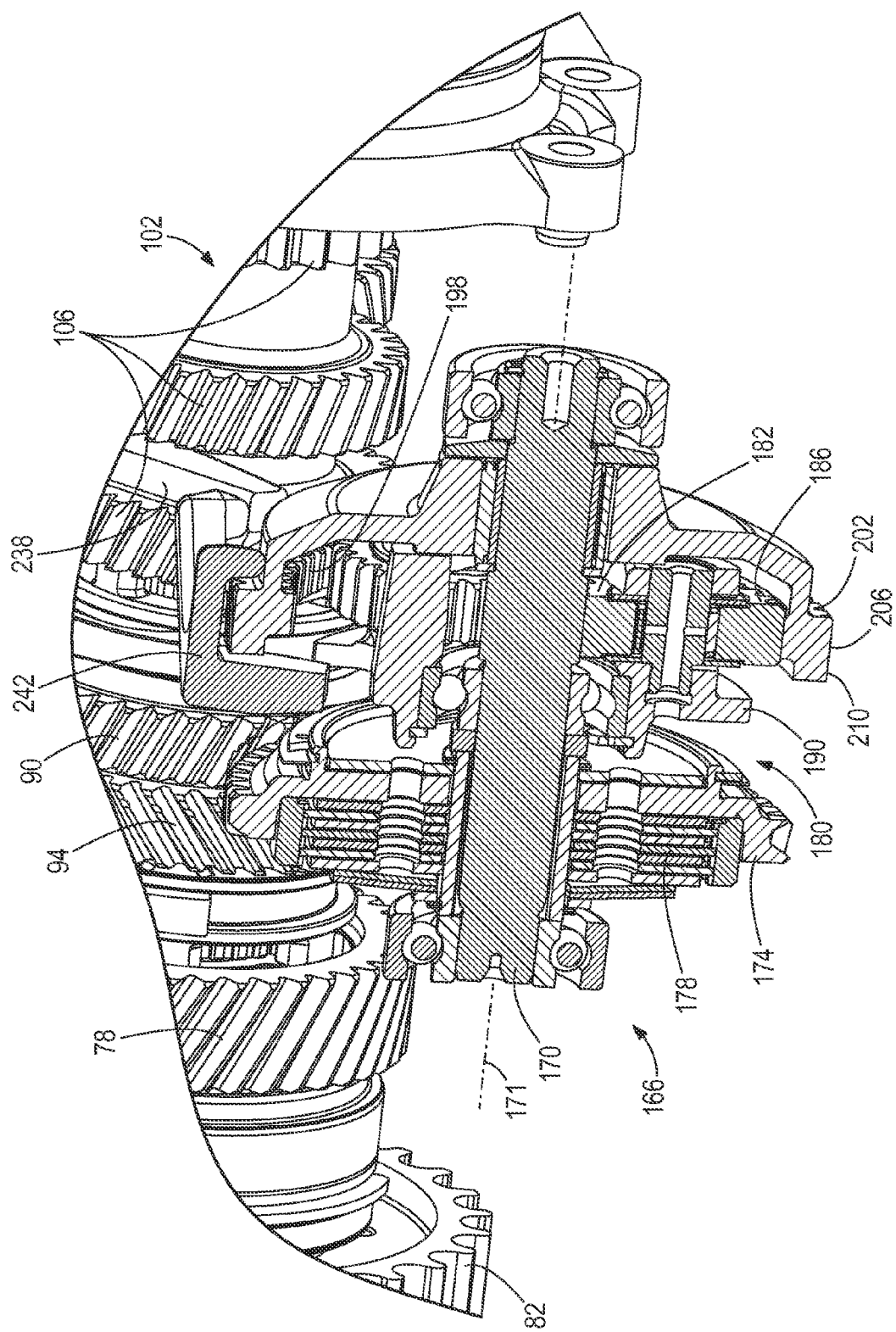
FIG. 6 is a cross-sectional view of a reverse drive assembly of the transmission assembly of FIG. 3B.
Figure 7:
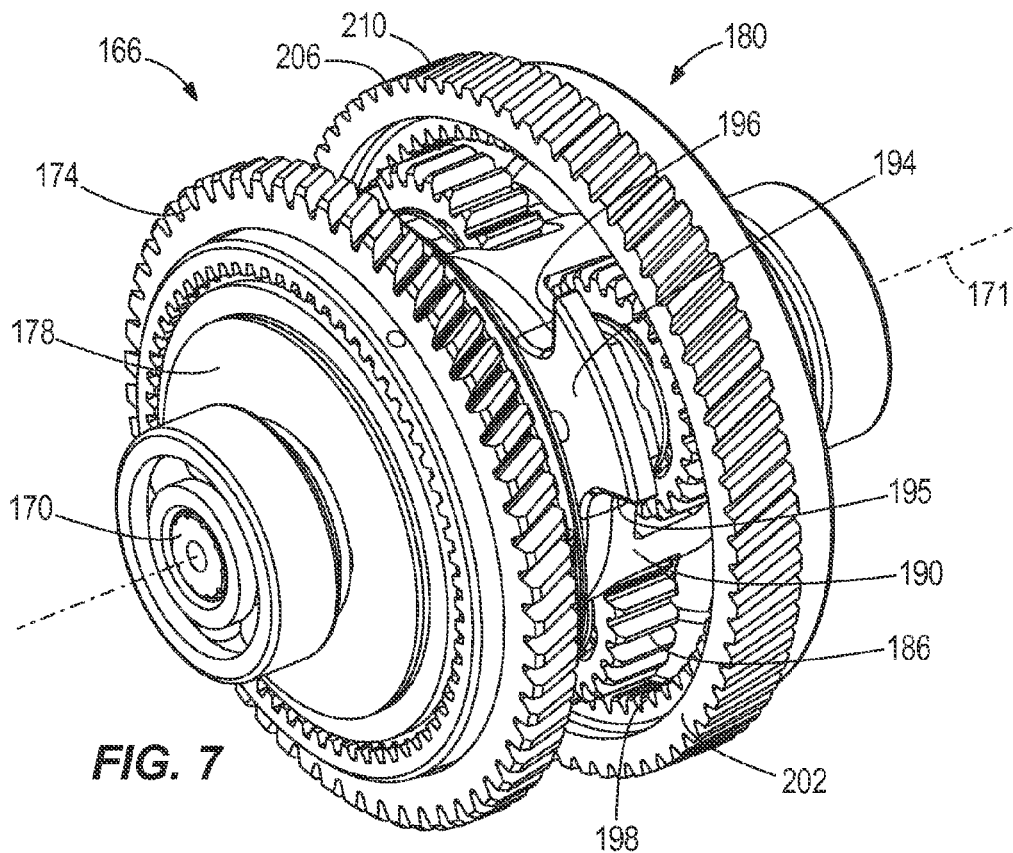
FIG. 7 is a perspective view of the reverse drive assembly of FIG. 6.
Figure 8:
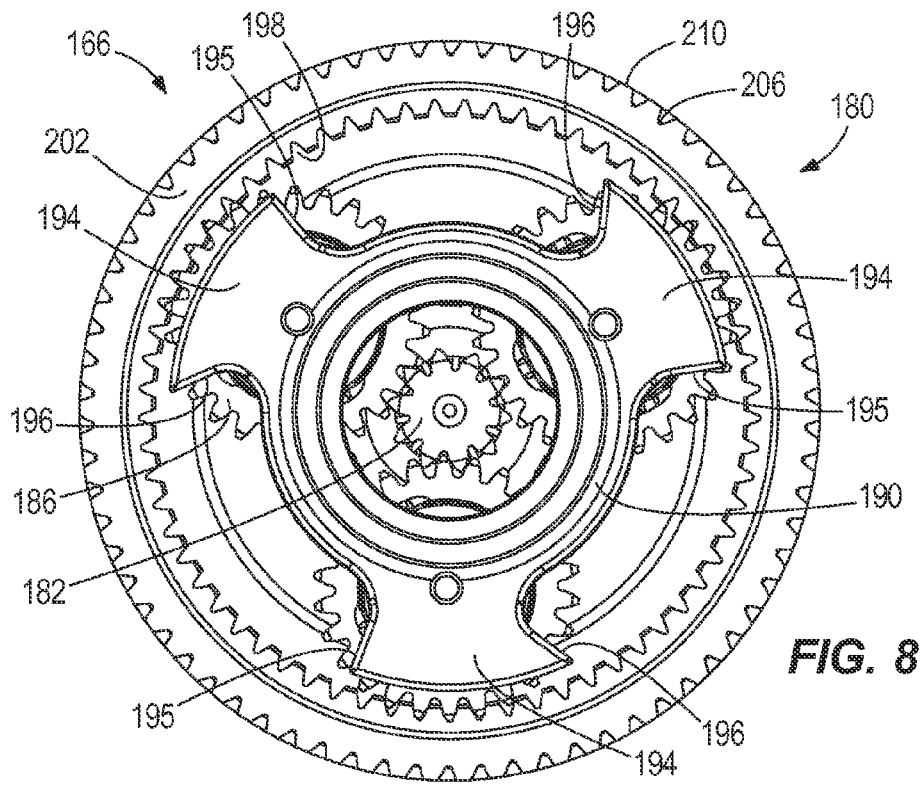
FIG. 8 is a front view of the reverse drive assembly of FIG. 6.

With reference to FIG. 5, the transmission assembly 62 includes a counter shaft assembly 134. The counter shaft assembly 134 includes a counter shaft 142 defining a counter shaft rotational axis 143. The counter shaft assembly 134 is mounted within the transmission housing 67 with the counter shaft rotational axis 143 substantially parallel to the main shaft rotational axis 73. The counter shaft assembly 134 includes a plurality of gears 138 supported on the counter shaft 142, each of which is provided in constant mesh with a corresponding one of the plurality of gears 106 of the half shaft 102, to provide a corresponding number of different gear ratios therebetween. Additionally, the counter shaft assembly 134 includes a gear 144 in constant mesh with the gear 90 on the main shaft 72 and a gear 145 in constant mesh with the gear 94 on the main shaft 72. The counter shaft assembly 134 further includes an output gear 146 in constant mesh with the output drive gear 78 of the output drive assembly 74. The output gear 146 is rotated directly with the counter shaft 142. The counter shaft assembly 134 is therefore operable to take rotational power from the main shaft 72 via one of the plurality of gears 138, 144, 145 and transmit the rotational power to the output drive assembly 74 via the counter shaft 142 and the output gear 146.

The counter shaft assembly 134 further includes a first dog ring 147 (FIG. 14) and a second dog ring 148, each of which is locked (e.g., splined) for rotation with the counter shaft 142 and slideable thereon. The first dog ring 147 is mounted between two of the plurality of gears 138 on the counter shaft 142. The second dog ring 148 is mounted between one of the plurality of gears 138 and the gear 144 on the counter shaft 142. The first dog ring 147 is a lug dog ring including a plurality of lugs 150 that correspond to a plurality of pockets 158 on two of the plurality of gears 138. The second dog ring 148 is a pocketed dog ring including a plurality of pockets 154 that correspond to a plurality of lugs 162 on one of the gears 138 and the gear 144. The first and second dog rings 147, 148 can be a pocketed dog ring with pockets 154 or a lug dog ring with lugs 150 depending on the mating gear construction. The dog rings 147, 148, in conjunction with the dog rings 98 and 118 of the main shaft assembly 68, are selectable via a shift assembly 214 to establish the gear ratio of the transmission assembly 62. The shift assembly 214 is described in further detail below.

With reference to FIGS. 4 and 5, the shift assembly 214 is positioned proximate both the main shaft assembly 68 and the countershaft assembly 134, and includes a shift drum 218 coupled to the foot shifter 46 via a linkage 220. The shift drum 218 is substantially cylindrical and includes a plurality of curved or straight tracks 222 formed in the outer-periphery of the shift drum 218. A plurality of shift forks 226 of the shift assembly 214 are supported on at least one shift fork rod 230 mounted proximate the shift drum 218 and substantially parallel to the axes 73, 143. As illustrated, the transmission assembly 62 includes two shift fork rods 230, one for the shift forks 226 engaged with dog rings 98, 118 on the main shaft 72, and another for shift forks 226 engaged with dog rings 147, 148 on the counter shaft 142. The shift forks 226 are slideably coupled to the shift fork rods 230 and are drivably coupled to the dog rings 147, 148 supported on the counter shaft 142, the dog rings 98, 118 supported on the main shaft 72.

With reference to FIGS. 4-8, the transmission assembly 62 further includes a reverse drive assembly 166 having a reverse drive shaft 170 defining a reverse drive rotational axis 171. The reverse drive assembly 166 is positioned within the transmission housing 67 with the reverse drive rotational axis 171 substantially parallel to the main shaft rotational axis 73 on a side opposite the counter shaft assembly 134. The reverse drive assembly 166 includes a reverse drive input gear 174 supported on the reverse drive shaft 170 in constant mesh with the gear 90 on the main shaft 72. Because the gear 90 is always rotated with the main shaft 72, the reverse drive assembly 166 always receives rotational input from the main shaft 72 via the gear 90 and the reverse drive input gear 174 while in both forward and reverse gears. The reverse drive assembly 166 includes a torque limiter 178 that limits the amount of input torque from the main shaft 72 transmitted to the reverse drive assembly 166. A planetary gear system 180 is supported on the reverse drive shaft 170 and includes a sun gear 182 coupled to the reverse drive shaft 170 and in constant mesh with a plurality of planet gears 186. A planet gear carrier 190 supports the planet gears 186 and includes a plurality of lugs 194 extending radially on the planet gear carrier 190. Each of the lugs 194 include a first face 195 and an opposite second face 196. The first face 195 is a straight face, generally aligned along a radial line of the planetary gear system 180, and the second face 196 is an angled face, not generally aligned along a radial line of the planetary gear system 180. The planet gears 186 are in constant mesh with the sun gear 182 and an inner circumferential surface 198 of a ring gear 202. An outer circumferential surface 210 of the ring gear 202 is provided with teeth forming a reverse drive output gear 206 in constant mesh with one of the plurality of gears 106 of the half shaft 102. Although the reverse drive output gear 206 is in constant mesh with one of the half shaft gears 106, the reverse drive assembly 166 is selectively changeable from passively allowing a forward drive (i.e. a non-torque-transmitting mode) to transmitting reverse drive power (i.e., a torque-transmitting mode). In alternative constructions, the reverse drive output gear 206 is positioned in constant mesh with the gear 78 of the output drive assembly 74.

Figure 9:
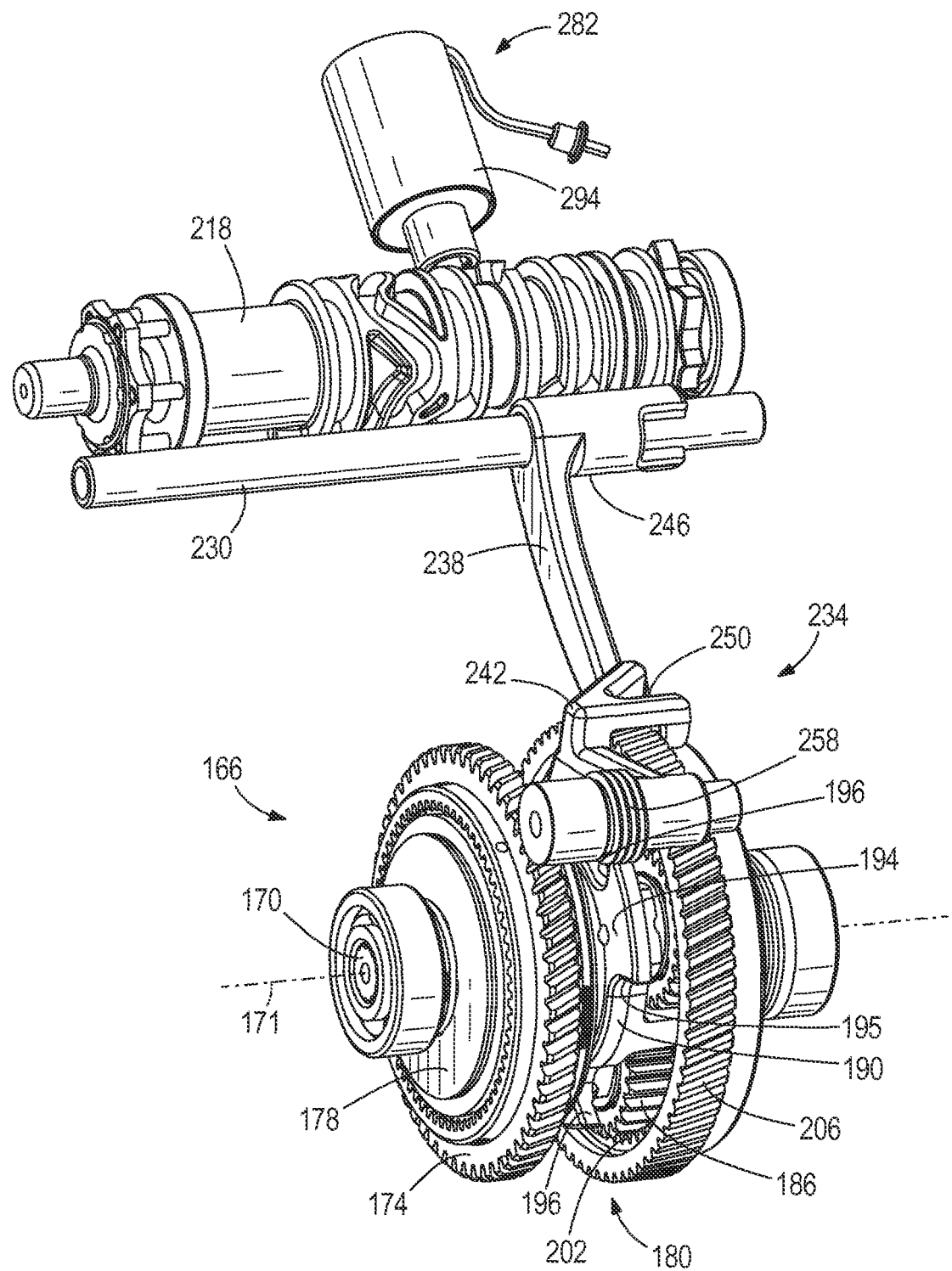
FIG. 9 is a perspective view of the reverse drive assembly of FIG. 6 and a carrier locking assembly operable by a shift drum.
Figure 10A:
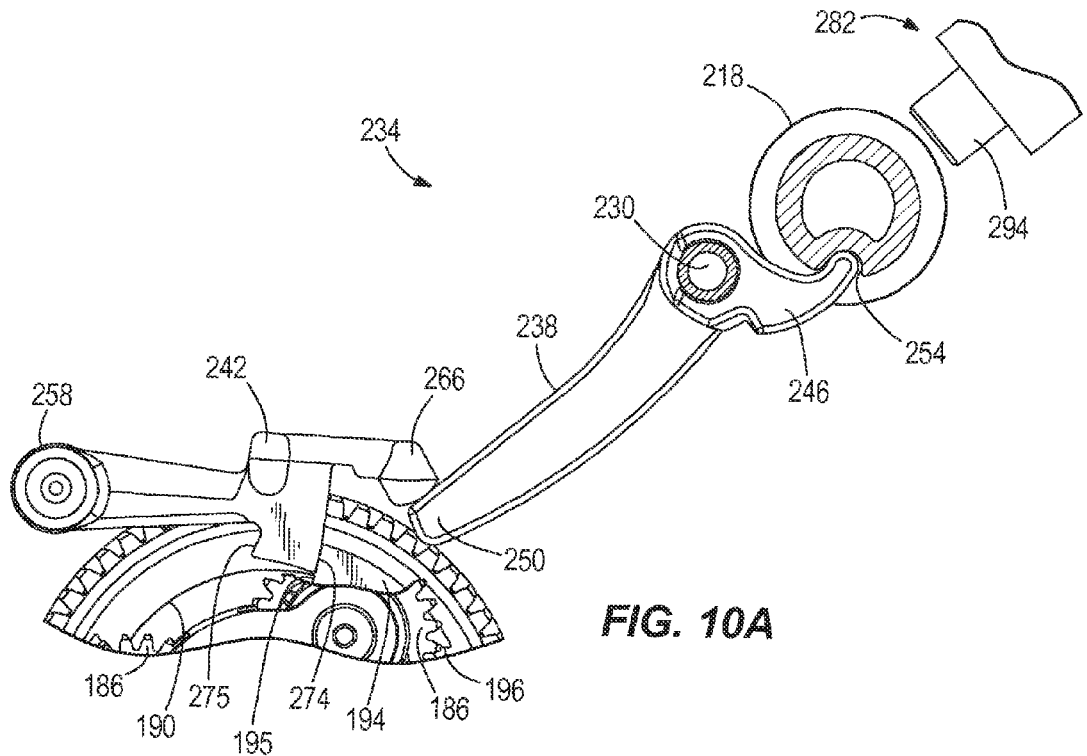
FIG. 10A is a side view of the carrier locking assembly of FIG. 9 in a first, locked position under reverse driving conditions.
Figure 10B:
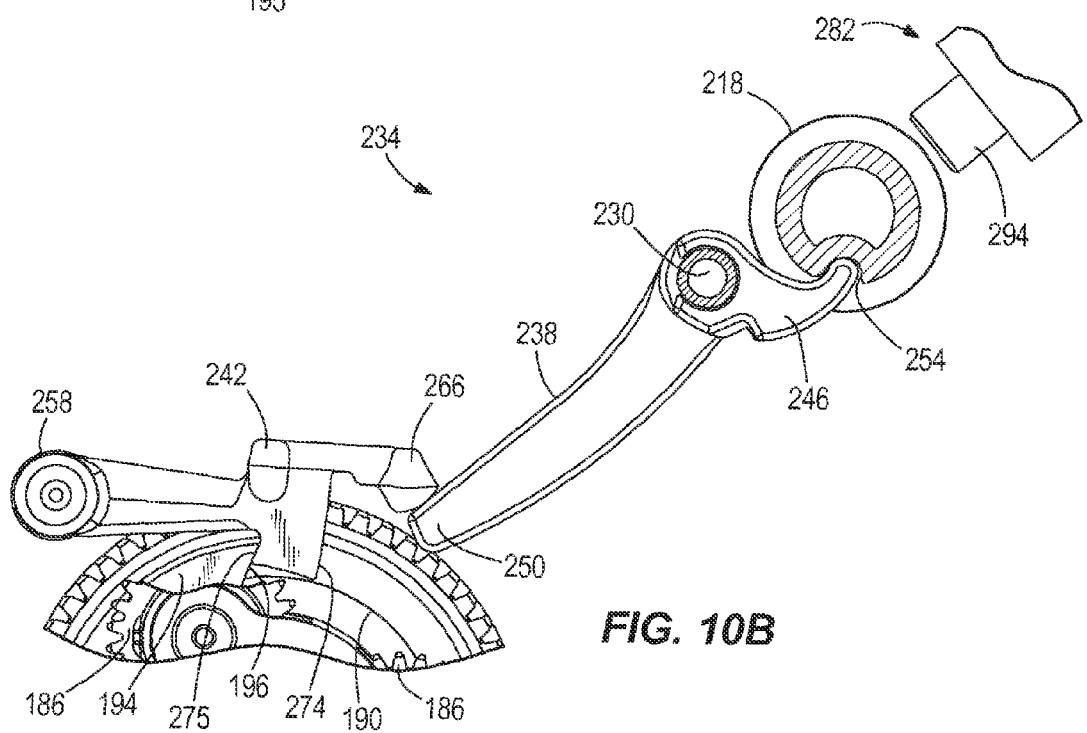
FIG. 10B is a side view of the carrier locking assembly of FIG. 9 in the first, locked position under reverse braking conditions.
Figure 11:
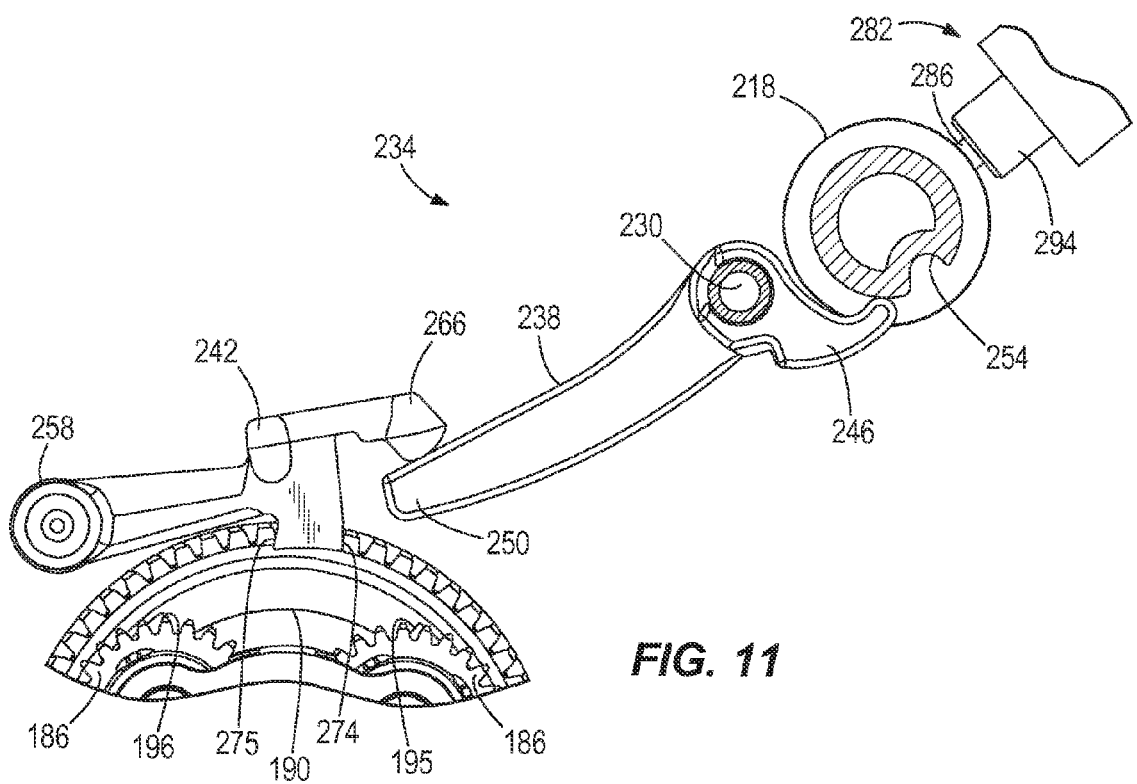
FIG. 11 is a side view of the carrier locking assembly of FIG. 9 in a second, unlocked position.

With reference to FIG. 9-11, a carrier locking assembly 234 is coupled to the shift fork rod 230 and includes a rocker arm 238 and a pawl arm 242. The carrier locking assembly 234 is operable to selectively prevent or allow rotation of the planet gear carrier 190. The rocker arm 238 is rotatably supported on the shift fork rod 230, coupled to the shift drum 218 at a first end 246, and coupled to the pawl arm 242 at a second end 250. The shift drum 218 includes a recess 254 into which the first end 246 of the rocker arm 238 is received. The pawl arm 242 is biased by a biasing member 258 to a first locked position (FIGS. 10A and 10B) in which either a first face 274 or an opposite, second face 275 of the pawl arm 242 is positioned to interfere with the lugs 194 of the planet gear carrier 190, preventing rotation thereof. The first face 274 is a straight face, generally aligned along a radial line of the planetary gear system 180, and the second face 275 is an angled face, not generally aligned along a radial line of the planetary gear system 180. FIGS. 10A and 10B illustrate the planet gear carrier 190 with a partial cut-away of the planet gear 186 for clarity. During reverse driving conditions, the straight face 274 of the pawl arm 242 engages the straight face 195 of the lug 194 (FIG. 10A). During reverse driving conditions when the engine is used for braking (e.g., reversing down a hill), the planet gear carrier 190 rotates in the opposite direction until the angled face 196 of the lug 194 engages the angled face 275 of the pawl arm (FIG. 10B). The angled faces 196, 275 mate to help keep the pawl arm 242 lowered in the first position during engine braking. The second end 250 of the rocker arm 238 engages a first end 266 of the pawl arm 242 to lift the pawl arm 242 to a second, unlocked position (FIG. 11). In the second position, the pawl arm 242 is spaced from the lugs 194 so that the planet gear carrier 190 is not prevented from rotating. During normal forward driving operation, the pawl arm 242 is kept in the second position. Only when reverse gear is actuated is the first end 246 of the rocker arm 238 received in the recess 254 to lower the first end 266 of the pawl arm 242, placing the faces 274, 275 in interference with the lugs 194 and preventing the planet gear carrier 190 from rotating thereby causing the reverse drive output gear 206 to reverse direction.

Figure 12:
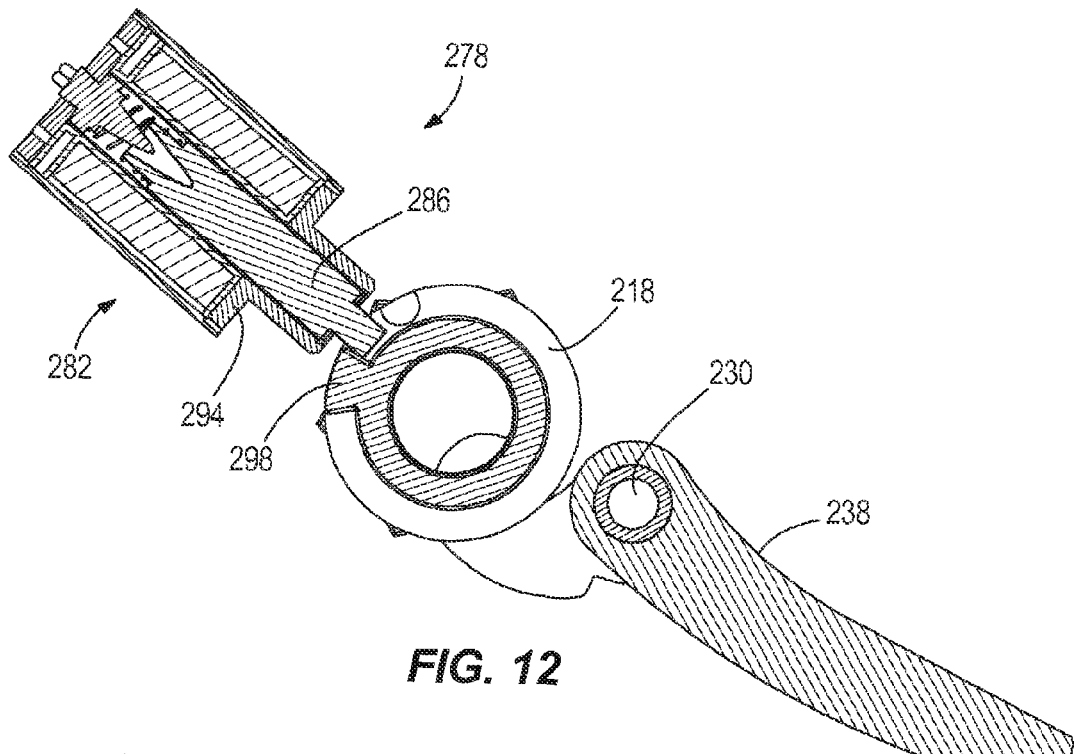
FIG. 12 is a cross-sectional view of a reverse lock-out assembly in a first, locked position that prevents rotation of the shift drum to a reverse position.
Figure 13:
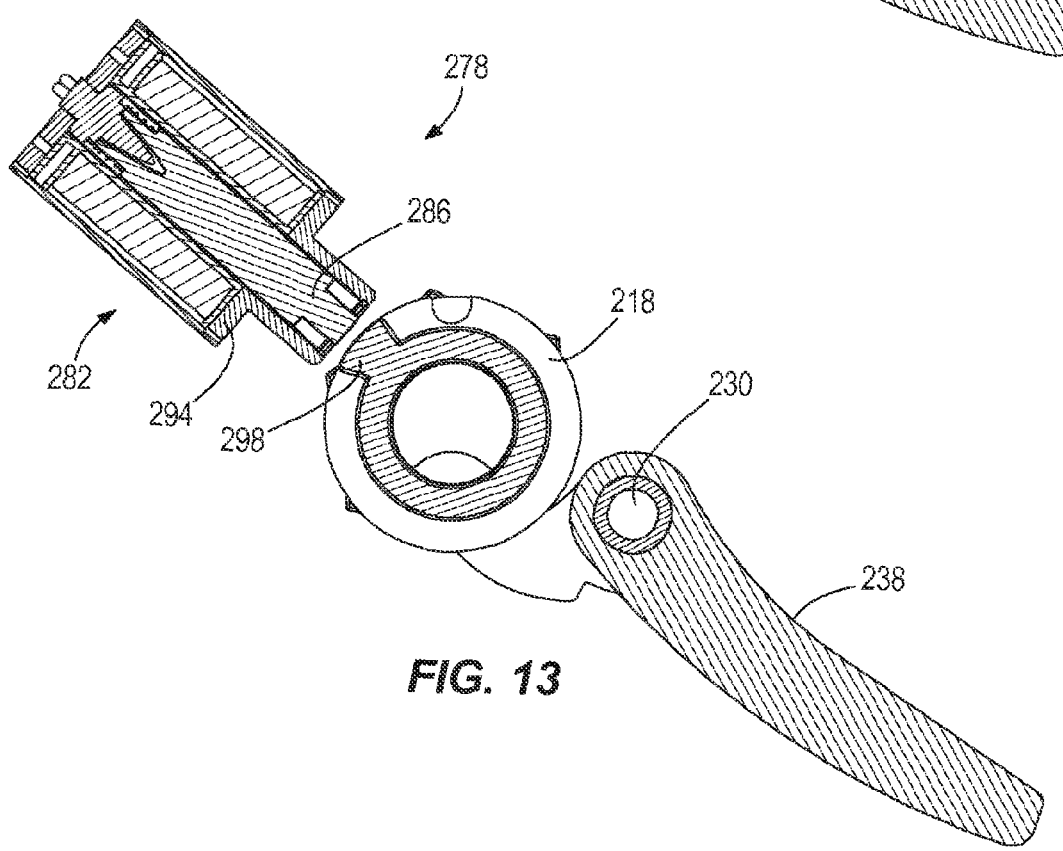
FIG. 13 is a cross-sectional view of a reverse lock-out assembly in a second, unlocked position that allows rotation of the shift drum to the reverse position.

With reference to FIGS. 12 and 13, the shift assembly 214 further includes a reverse lock-out assembly 278. The reverse lock-out assembly 278 includes a locking mechanism, or solenoid 282, including a plunger 286. The plunger 286 has a first position (FIG. 12) and a second position (FIG. 13). When in the first position, the plunger 286 extends from a solenoid housing 294 and interferes with a lock-out protrusion 298 on the shift drum 218 to prevent the shift drum 218 from being rotated to the reverse gear position (FIGS. 11 and 12). When the plunger 286 is in the second position, the plunger 286 is spaced from the lock-out protrusion 298 to allow the shift drum 218 to rotate to the reverse gear position (FIGS. 10 and 13). The plunger 286, when in the second position can retract inside of the solenoid housing 294. The reverse lock-out assembly 278 can be operated to prevent the user from inadvertently shifting the transmission assembly 62 into a reverse gear ratio with the foot-operated shifter 46. Only when certain criteria have been met (e.g., motorcycle is at a stop, the users presses a reverse engage button, etc.) does the reverse lock-out assembly 278 allow the transmission assembly 62 to shift into reverse.

Forward driving power is established from the engine 54 to the transmission assembly 62 via the primary loop member 63, and through a forward power transmission path 302 (FIG. 14) of the transmission assembly 62. Finally, from the transmission assembly 62, power is supplied to the rear wheel(s) 30 via the final drive loop member 86, propelling the motorcycle 10, 58 forward. The transmission assembly 62 is operable to provide a plurality of forward gear ratios. The forward gear ratios change the rotational speed of the engine crankshaft 55 to a suitable speed to be applied to the rear wheel(s)

30. Different forward gear ratios are established depending on which gears are locked for rotation with the main shaft 72 and the counter shaft 142 as dictated by the shift assembly 214 and the sequential action of the footshifter 46. For example, in response to user input of the foot shifter 46, linkage 220 rotates the shift drum 218. Corresponding to the rotation of the shift drum 218, the tracks 222 force the shift forks 226 to slide along the rods 230. The sliding of the shift forks 226 moves the dog rings 98, 118, 147, and 148 into or out of engagement with corresponding gears in a predetermined pattern to establish a first forward gear, second forward gear, third forward gear, etc.

The half shaft 102 is operable in the locked condition (FIG. 14) in which the half shaft 102 is coupled with the main shaft 72 for co-rotation, and operable in an unlocked condition (FIGS. 15 and 16) in which the half shaft 102 is rotatable about the main shaft 72. The shift fork 226 of the shifting assembly 214 is operable to slide the dog ring 118 into engagement with the half shaft 102, locking the half shaft 102 for co-rotation with the main shaft 72. When the dog ring 118 is engaged with the half shaft 102 (FIG. 14), the half shaft 102 is locked to the main shaft 72 and is drivingly engaged with both the counter shaft 142 (through one of the gears 138) and the output gear 206 of the reverse drive assembly 166. When the dog ring 118 is not engaged with the half shaft 102, the half shaft 102 is free to rotate independent of the main shaft 72. The half shaft 102 is not locked with the main shaft 72 for reverse gear ratio and for forward gear ratios that do not transfer power through one of the gears 138 on the counter shaft 142. When the gears 138 are not being utilized on the counter shaft 142, power from the main shaft 72 is transmitted directly to one of the gears 144, 145 on the counter shaft 142 via the corresponding gear 90, 94 on the main shaft 72. The main shaft 72 can directly drive the output drive assembly 74, without transferring the power to the counter shaft 102, by locking the output drive gear 78 to the main shaft 72 for co-rotation with the dog ring 98 (i.e., a direct drive). In those gear ratios where power is not transmitted through one of the gears 138 meshed with the half shaft gears 106, the half shaft 102 can be unlocked from the main shaft 72 to reduce power loss and improve the fuel economy and emissions of the engine/transmission unit 18.

In forward gear ratios, the reverse drive input gear 174 is driven by the main shaft gear 90. In addition, the reverse drive output gear 206 is driven by the half shaft 102 (when locked to the main shaft 72) in forward gear ratios. The input 174 and the output 206 of the reverse drive assembly 166 are thus both being driven at different speeds. The planetary gear system 180 compensates for the speed differential at the input 174 and the output 206 of the reverse drive assembly 166 by freely rotating the planet gear carrier 190. The reverse drive assembly 166 is thus in a free-wheeling mode, or a non-torque transmitting mode, when the transmission 62 operates in forward gear ratios, allowing for differential speed at the input 174 and the output 206. Therefore, the reverse drive assembly 166 is always connected in constant mesh with the main shaft 72, and does not need to be disconnected in forward gear ratios.

Figure 14:
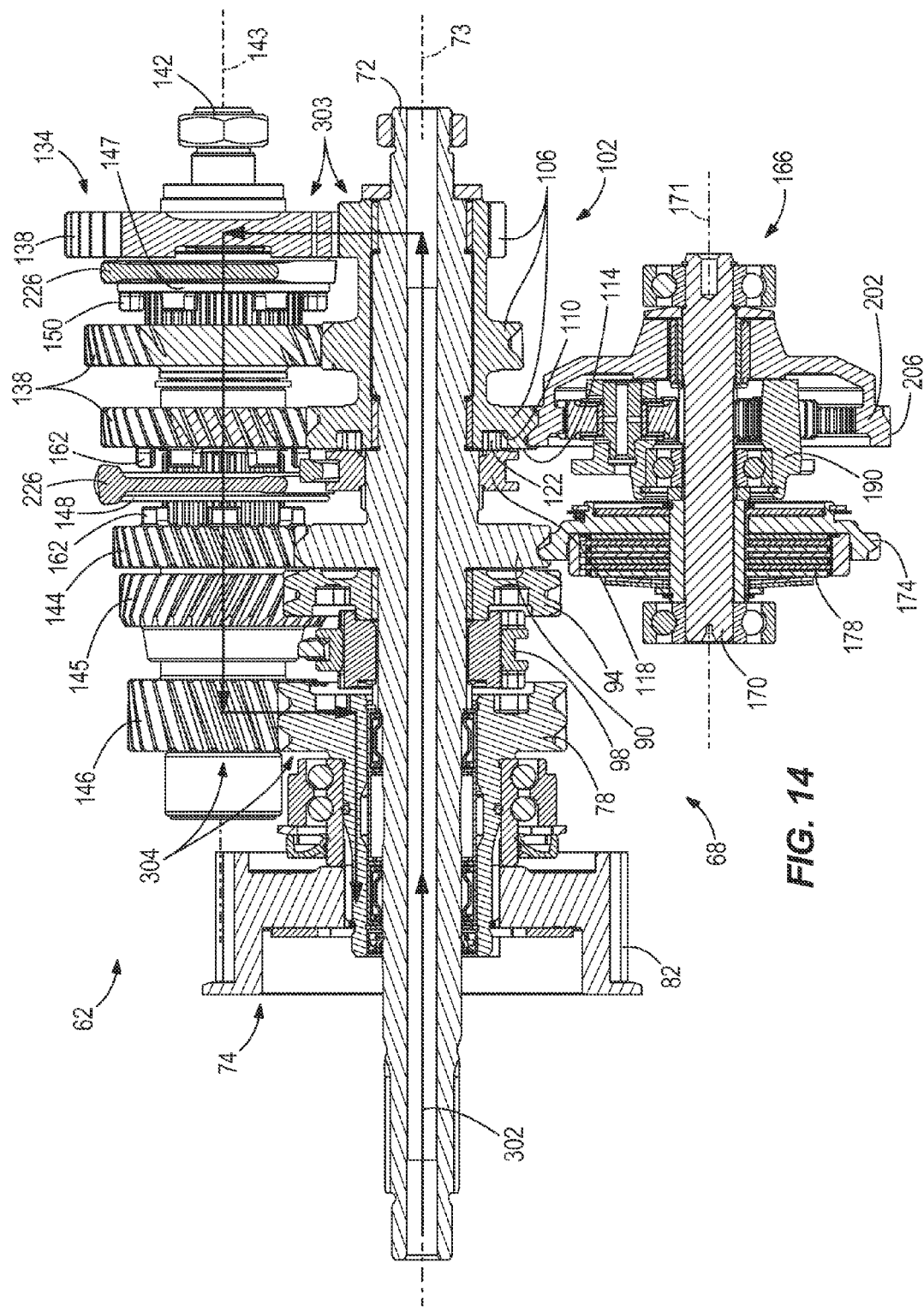
FIG. 14 is a cross-sectional view of the transmission assembly of FIG. 3B in a forward power transmission path configuration.

It will be appreciated by one skilled in the art, that combinations of gears engaged or disengaged creating a power transmission path from the main shaft 72 to the output drive assembly 74 create different forward gear ratios. The shift forks 226 are received by the corresponding tracks 222 on the shift drum 218 so that rotation of the shift drum 218 changes the shift assembly 214 from one arrangement representing one gear ratio to another. The forward power transmission path 302 (FIG. 14) is thus selectively established from the main shaft 72 and the half shaft 102 in the locked condition, to the counter shaft 142 through a meshed gear pair 303 of one of the gears 106 of the half shaft 102 and one of the gears 138 on the counter shaft 142. From the counter shaft 142, the power transmission path 302 continues to the output drive assembly 74 through a meshed gear pair 304 of the output gear 146 of the counter shaft 142 and the gear 78 of the output drive assembly 74. The forward power transmission path 302, shown in FIG. 14, represents a first gear ratio configuration. Although other gear ratio configurations are possible, these are not all shown for the sake of brevity.

Figure 15:
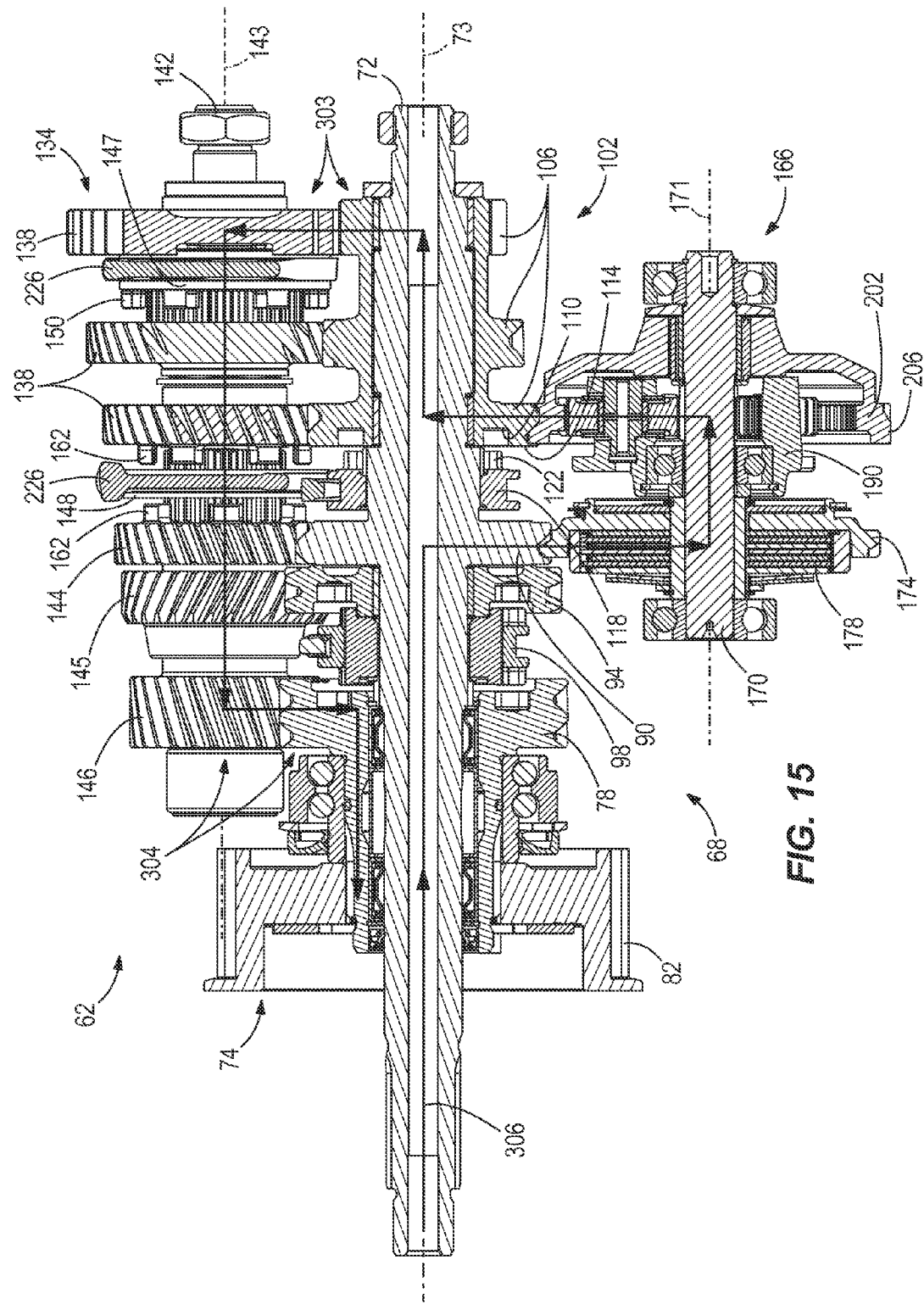
FIG. 15 is a cross-sectional view of the transmission assembly of FIG. 3B in a reverse power transmission path configuration.

In addition to the plurality of forward power transmission paths, reverse driving power can be established from the engine 54 to the transmission assembly 62 via the primary loop member 63, and through a reverse power transmission path 306 (FIG. 15) of the transmission assembly 62. Finally, from the transmission assembly 62, power is supplied to the rear wheel(s) 30 via the final drive loop member 86, propelling the motorcycle 10, 58 backwards. Although only one reverse gear ratio is selectable by the user when the transmission is installed in a particular motorcycle, the structure of the transmission 62 is configured to provide a plurality of different reverse gear ratio options for installation in different motorcycles. The option of reverse gear ratios at installation provides the manufacturer greater flexibility without drastically increasing inventory or part count. The reverse power transmission path 306 transmits reverse power from the half shaft 102, to the counter shaft 134 though the meshed gear pair 305, similar to the forward power transmission path 302 (FIG. 14). The reverse power transmission path 306, of FIG. 15 is representative of a low-speed reverse gear ratio (e.g., maximum 1.1 mph reverse speed). The low-speed reverse gear ratio can be used for a smaller 2-wheeled motorcycle 10.

Figure 16:
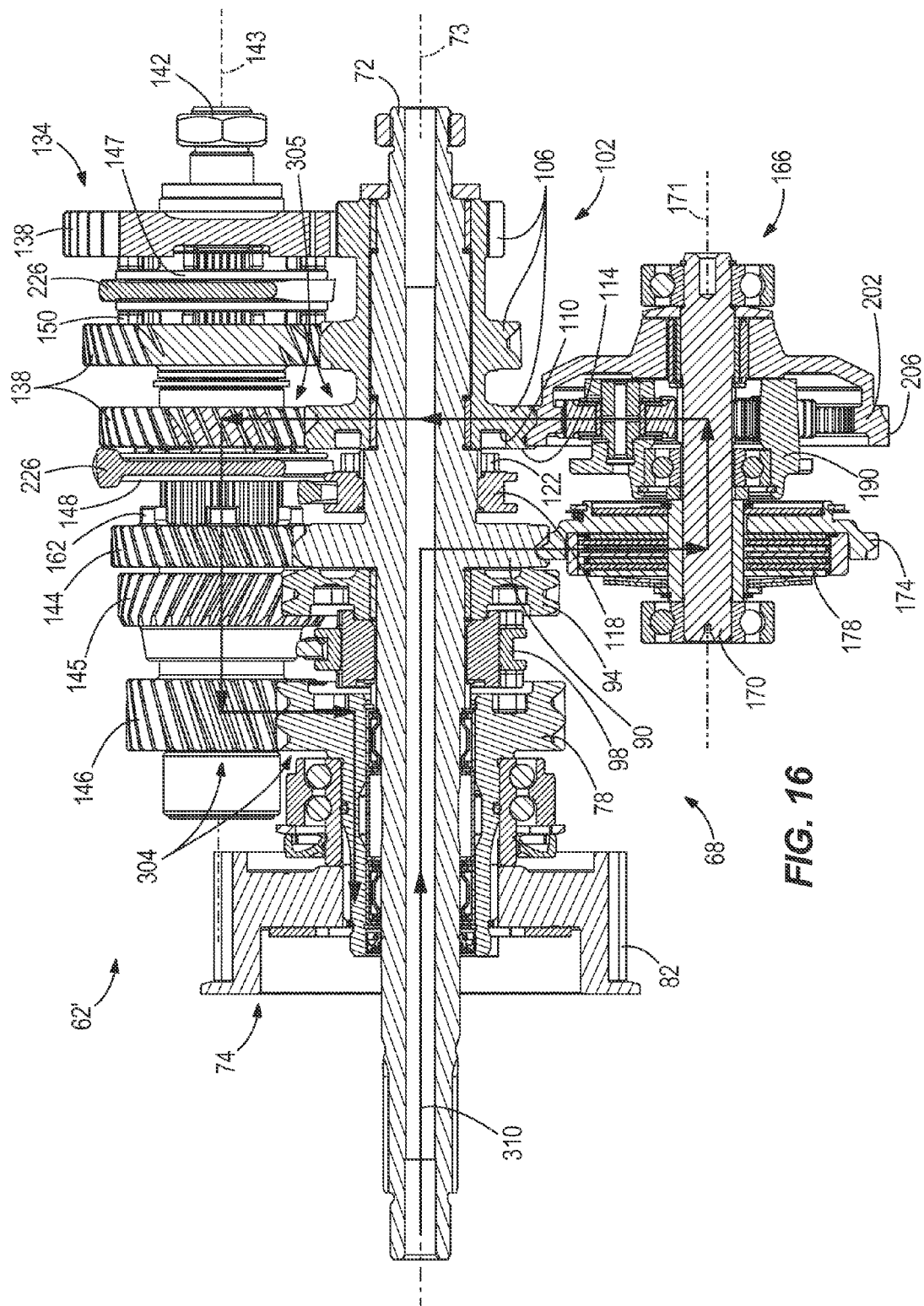
FIG. 16 is a cross-sectional view of an alternative transmission assembly configured to provide a reverse power transmission path having a different gear ratio than that of FIG. 15.

An alternative transmission 62' is identical to transmission 62, except for which of the gears 138 and dog rings 147, 148 are engaged to provide reverse, as dictated by the shift drum 218 configuration (FIG. 16). The transmission 62' transmits reverse power from the half shaft 102, to the counter shaft 134 through a meshed gear pair 305 of one of the gears 106 of the half shaft 102 and one of the gears 138 on the counter shaft 142 (different from the meshed gear pair 303, providing a higher maximum reverse speed). Reverse driving power can be established from the engine 54 to the transmission assembly 62' via the primary loop member 63, and through a reverse power transmission path 310 of the transmission assembly 62'. Finally, from the transmission assembly 62', power is supplied to the rear wheel(s) 30 via the final drive loop member 86, propelling the motorcycle 10, 58 backwards. The reverse power transmission path 310 is representative of a high-speed reverse gear ratio (e.g., 2.2 mph maximum reverse speed). The transmission 62' can be used for a larger 3-wheeled motorcycle 58 with inherent stability. The reverse gear ratio reduces and reverses the rotational speed of the engine crankshaft 55 to a suitable speed to be applied to the rear wheel(s) 30. The different reverse gear ratios of the different reverse power transmission paths 306, 310 are established depending on which one of the gear pairs 303, 305 are active for driving the countershaft 142 as determined by the shift drum configuration.

During reverse operation, the input gear 174 of the reverse drive assembly 166 is driven by the main shaft gear 90, and the reverse drive output gear 206 drives the half shaft 102, which is in the unlocked condition. In reverse, the carrier locking assembly 234 locks the planet gear carrier 190 in place, inhibiting rotation of the carrier 190. Locking the planet gear carrier 190 reverses the direction of rotation of the ring gear 202, and thus the output gear 206. The sun gear 182 is driven by the reverse drive shaft 170 in both forward and reverse gear ratios, but the planet carrier 190 is locked against rotation in reverse gear ratio such that the direction of rotation of the output gear 206 is reverse from the normal (forward) direction of rotation.

With reference to FIGS. 9-13, in order to shift into the reverse gear ratio, the solenoid 282 of the reverse lock-out assembly 278 is activated such that the plunger 286 moves from the first position (FIG. 12) to the second position (FIG. 13) and retracts into the solenoid housing 294 away from the lock-out protrusion 298 on the shift drum 218. The reverse lock-out assembly 278 can be actuated directly by a user control (e.g., button), or automatically by a motorcycle controller upon sensing an allowable set of circumstances. The user is then able to rotate the shift drum 218 via shifter 46 into a position corresponding to the reverse gear ratio. Once the shift drum 218 is rotated into the reverse drive position, the recess 254 on the shift drum 218 receives the first end 246 of the rocker arm 238, biased by biasing member 258. The biasing member 258 then biases the pawl arm 242 into the first position (FIG. 10A). When the pawl arm 242 is in the first position, the first face 274 of the pawl arm 242 engages the first face 195 on one of the lugs 194 on the planet gear carrier 190, preventing rotation of the carrier 190. Similarly, when the user shifts out of reverse, the shift drum 218 is rotated via shifter 46 and the first end 246 of the rocker arm 238 is removed from the recess 254. By removing the first end 246 from the recess 254 the rocker arm 238 raises pawl arm 242 against the biasing force of the biasing member 258.

The reverse power transmission path 306, of FIG. 15 is established by meshing the reverse drive output gear 206 with one of the plurality of gears 106 on the half shaft 102, when the half shaft 102 is placed in the unlocked condition. Simultaneously, one of the gears 138 supported on the counter shaft 142 is locked to the counter shaft 142. In the reverse power transmission path 306 of the first transmission 62, the dog ring 147 is engaged with the corresponding one of the gears 138 on the counter shaft 142 and the dog ring 148 is disengaged from any gear. The reverse power transmission path 306 is established from the main shaft 72, through the reverse drive assembly 166, to the half shaft 102 (in the unlocked condition). From the half shaft 102, the power is transmitted to the counter shaft 134 through the meshed gear pair 303 (selected at installation of the transmission assembly 62 by configuration of the shift drum 218). From the counter shaft 142, the power is transmitted to the output drive assembly 74 through the meshed gear pair 304.

The reverse power transmission path 310, of the transmission 62' of FIG. 16 is established by meshing the reverse drive output gear 206 with one of the plurality of gears 106 on the half shaft 102 when the half shaft 102 is placed in the unlocked condition. Simultaneously, one of the gears 138 supported on the counter shaft 142 is locked to the counter shaft 142. In the reverse power transmission path 310 of the alternative transmission 62', the dog ring 148 is engaged with the corresponding one of the gears 138 on the counter shaft 142 and the dog ring 147 is disengaged from any gear. The reverse power transmission path 310 is established from the main shaft 72, through the reverse drive assembly 166, to the half shaft 102 (in the unlocked condition). From the half shaft 102, the power is transmitted to the counter shaft 134 through the meshed gear pair 305 (different from the meshed gear pair 303, and selected at installation of the transmission assembly 62'). From the counter shaft 142, the power is transmitted to the output drive assembly 74 through the meshed gear pair 304.

The reverse power transmission path 306, 310 are established from the engine 54 to the transmission 62, 62' via the primary loop member 63 as in forward driving, but the transmission output drive member 82 is operable to drive the final drive loop member 86 in reverse, opposite the direction of the forward power transmission path 302. Reverse driving power is supplied from the engine 54, and no secondary power source is needed. As illustrated the half shaft 102 provides three different reverse gear ratio options corresponding to each the gears 106. Although only one reverse gear ratio may be selected at installation, the half shaft 102 provides the manufacturer flexibility in selecting the reverse gear ratio.

The multi-gear half shaft 102, which is lockable and un-lockable on the main shaft 72, provides many benefits over a traditional main shaft assembly. The first benefit is that the half shaft 102 allows the addition of the reverse drive assembly 166 to the transmission 62 with multiple reverse ratio options to be chosen at the time of installation. Secondly, the half shaft 102 can be placed in the unlocked condition while the transmission 62 is in a neutral gear (i.e., neither transmitting power in forward nor in reverse) to minimize noise levels (i.e., neutral rattle) while the engine/transmission unit 18 is idling. Thirdly, the half shaft 102 can be unlocked when the transmission 62 is in a forward gear ratio that does not utilize the half shaft 102 to transmit power (i.e., when the main shaft 72 is transmitting power directly to the counter shaft assembly 134 or output drive assembly 74). By disengaging the half shaft 102 when not in use, there is reduced gear churning and mesh pumping of transmission fluid, improving the overall fuel economy and emissions of the engine/transmission unit 18.

Various features and advantages of the invention are set forth in the following claims.

What is claimed is:
1. A transmission assembly comprising:
  a main shaft assembly including a main shaft gear provided on a main shaft and rotatable therewith;
  a half shaft supported on the main shaft and including a plurality of co-rotating gears, the half shaft operable in a locked condition in which the half shaft is rotationally fixed with the main shaft, and an un-locked condition in which the half shaft is rotatable about the main shaft;
  a counter shaft assembly including a plurality of gears supported on a counter shaft, the plurality of gears being in constant mesh with corresponding ones of the plurality of gears of the half shaft;
  an output drive supported on the main shaft and drivable by the counter shaft, wherein a forward power transmission path is established from the main shaft and the half shaft in the locked condition, through the counter shaft, to the output drive; and
  a reverse drive assembly including a reverse drive shaft, a reverse drive input gear in constant mesh with the main shaft gear, a planetary gear system, and a reverse drive output gear, wherein the reverse drive output gear is configured to drive a predetermined one of the plurality of gears on the counter shaft through a corresponding one of the half shaft gears when the half shaft is in the un-locked condition to establish a reverse power transmission path from the main shaft, to the reverse drive assembly, through the half shaft in the un-locked condition, to the predetermined counter shaft gear, and to the output drive.

2. The transmission assembly of claim 1, further including a shifting assembly operable to select the locked or un-locked condition of the half shaft, and operable to engage the reverse drive assembly to establish the reverse power transmission path.

3. The transmission assembly of claim 2, wherein the planetary gear system includes a sun gear coupled to the reverse drive shaft, a planetary gear carrier supported relative to the sun gear around the reverse drive shaft, a plurality of planetary gears supported on the planetary gear carrier and meshing with the sun gear, and a ring gear meshing with the plurality of planetary gears and supported relative to the sun gear around the reverse drive shaft.

4. The transmission assembly of claim 3, wherein the reverse drive output gear is formed on the outer circumference of the ring gear.

5. The transmission assembly of claim 3, wherein the planetary gear carrier is rotatable about the reverse drive shaft when the transmission establishes the forward power transmission path, and the planetary gear carrier is rotationally locked to establish the reverse power transmission path.

6. The transmission assembly of claim 3, further comprising a dog ring configured to selectively set the half shaft into one of the locked condition and the un-locked condition, a carrier locking assembly configured to selectively prevent rotation of the planetary gear carrier, a shift drum, and a reverse lock-out mechanism.

7. The transmission assembly of claim 6, wherein the carrier locking assembly includes a pawl arm movable between a first position, in which the pawl arm engages the planetary gear carrier to lock the planetary gear carrier in position, and a second position, in which the pawl arm is spaced apart from the planetary gear carrier.

8. The transmission assembly of claim 7, wherein the carrier locking assembly further includes a biasing member that biases the pawl arm to the first position, and a rocker arm engageable with the shift drum to hold the pawl arm in the second position when the shift drum is in a position other than a reverse position.

9. The transmission assembly of claim 8, wherein the shift drum includes a recess configured to receive part of the rocker arm to allow the pawl arm to move from the second position to the first position when the shift drum is rotated to the reverse position.

10. The transmission assembly of claim 6, wherein the shift drum includes a reverse lock-out feature selectively interfering with the reverse lock-out mechanism to prevent the shift drum from selecting the reverse power transmission path.

11. The transmission assembly of claim 10, wherein the lock-out mechanism includes a solenoid operable with a plunger in a first position interfering with the reverse lock-out feature and a second position not interfering with the reverse lock-out feature, the solenoid plunger being movable to the second position when actuated by a user for utilizing the reverse power transmission path.

12. The transmission assembly of claim 1, wherein the reverse drive output gear is in constant mesh with one of the plurality of half shaft gears.

13. A transmission assembly comprising:
a main shaft assembly including a main shaft gear provided on a main shaft and rotatable therewith;
a half shaft supported on the main shaft and including a plurality of co-rotating gears, the half shaft operable in a locked condition in which the half shaft is rotationally fixed with the main shaft, and an un-locked condition in which the half shaft is rotatable about the main shaft;
a counter shaft assembly including a plurality of gears supported on a counter shaft, the plurality of gears being in constant mesh with corresponding ones of the plurality of gears of the half shaft;
an output drive supported on the main shaft and drivable by the counter shaft, wherein a forward power transmission path is established from the main shaft and the half shaft in the locked condition, through the counter shaft, to the output drive; and
a reverse drive assembly including a reverse drive shaft, a reverse drive input gear in constant mesh with the main shaft gear, and a reverse drive output gear, wherein the reverse drive assembly is operable in a torque-transmitting mode and a non-torque-transmitting mode; and
a shifting assembly operable to simultaneously select the unlocked condition of the half shaft and place the reverse drive assembly in the torque-transmitting mode, wherein the reverse drive output gear is configured to drive a predetermined one of the plurality of gears on the counter shaft through a corresponding one of the half shaft gears when the half shaft is in the un-locked condition to establish a reverse power transmission path from the main shaft, to the reverse drive assembly, through the half shaft in the un-locked condition, to the predetermined counter shaft gear, and to the output drive.

14. The transmission assembly of claim 13, wherein the reverse drive assembly further includes a planetary gear system.

15. The transmission assembly of claim 14, wherein the planetary gear system includes a sun gear coupled to the reverse drive shaft, a planetary gear carrier supported relative to the sun gear around the reverse drive shaft, a plurality of planetary gears supported on the planetary gear carrier and meshing with the sun gear, and a ring gear meshing with the plurality of planetary gears and supported relative to the sun gear around the reverse drive shaft.

16. The transmission assembly of claim 15, wherein the reverse drive output gear is formed on the outer circumference of the ring gear.

17. The transmission assembly of claim 15, where in the planetary gear carrier is rotatable about the reverse drive shaft when the transmission establishes the forward power transmission path, and the planetary gear carrier is rotationally locked to establish the reverse power transmission path.

18. The transmission assembly of claim 15, further comprising a dog ring configured to selectively set the half shaft into one of the locked condition and the un-locked condition, a carrier locking assembly configured to set the planetary gear carrier into the torque-transmitting mode, a shift drum, and a reverse lock-out mechanism.

19. The transmission assembly of claim 18, wherein the carrier locking assembly includes a pawl arm movable between a first position, in which the pawl arm engages the planetary gear carrier to lock the planetary gear carrier in position, and a second position, in which the pawl arm is spaced apart from the planetary gear carrier.

20. The transmission assembly of claim 19, wherein the carrier locking assembly further includes a biasing member that biases the pawl arm to the first position, and a rocker arm engageable with the shift drum to hold the pawl arm in the second position when the shift drum is in a position other than a reverse position.

21. The transmission assembly of claim 20, wherein the shift drum includes a recess configured to receive part of the rocker arm to allow the reverse pawl arm to move from the second position to the first position when the shift drum is rotated to the reverse position.

22. The transmission assembly of claim 18, wherein the shift drum includes a reverse lock-out feature selectively interfering with the reverse lock-out mechanism to prevent the shift drum from selecting the reverse power transmission path.

23. The transmission assembly of claim 22, wherein the locking mechanism includes a solenoid operable with a plunger in a first position interfering with the reverse lock-out feature and a second position not interfering with the reverse lock-out feature, the solenoid plunger being movable to the second position when actuated by a user for utilizing the reverse power transmission path.

24. The transmission assembly of claim 13, wherein the reverse drive output gear is in constant mesh with one of the plurality of half shaft gears.

\* \* \* \* \*